United States Patent
Pella et al.

(12) 
(10) Patent No.: US 6,234,802 B1
(45) Date of Patent: May 22, 2001

(54) VIRTUAL CHALLENGE SYSTEM AND METHOD FOR TEACHING A LANGUAGE

(75) Inventors: John P. Pella, Redmond; Quentin DeWolf; Peter C. Acker, both of Seattle; Charles A. Hale, Mountlake Terrace; Renée Louise April, Bellevue; Jason T. Cortese; Victor J. Bondi, both of Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/237,411

(22) Filed: Jan. 26, 1999

(51) Int. Cl.[7] .......................... G09B 19/00; G09B 19/06; G09B 19/08; G09B 19/04

(52) U.S. Cl. .......................... 434/156; 434/157; 434/185

(58) Field of Search .......................... 434/156, 157, 434/167, 169, 176, 178, 185

(56) References Cited

U.S. PATENT DOCUMENTS

| | | | |
|---|---|---|---|
| 4,445,187 | * 4/1984 | Best | 364/521 |
| 5,456,607 | 10/1995 | Antoniak . | |
| 5,774,878 | * 6/1998 | Marshall | 705/35 |
| 5,782,692 | * 7/1998 | Stelovsky | 463/1 |
| 6,012,926 | * 1/2000 | Hodges et al. | 434/236 |
| 6,050,822 | * 4/2000 | Faughn | 434/11 |

FOREIGN PATENT DOCUMENTS

| | | |
|---|---|---|
| 0 801 370 | 10/1997 | (EP) . |
| WO 98/11523 | 3/1998 | (WO) . |
| WO 98/35320 | 8/1998 | (WO) . |
| WO 00/22597 | 4/2000 | (WO) . |

OTHER PUBLICATIONS

Briggs, John C., "The Promise of Virtual Reality", Futurist, vol. 30 Issue 5, p. 13, 6p, Oct. 1996.*

Tanguay, Edward, "English Teachers, Prepare Yourselves for the Digital Age", Teaching English in the Network Age May, 1997.*

* cited by examiner

Primary Examiner—John Edmund Rovnak
(74) Attorney, Agent, or Firm—Michalik & Wylie, PLLC (57) ABSTRACT

A method and system for teaching a language and evaluating language comprehension in a digitally synthesized, interactive three-dimensional graphical representation of an environment. Within the environment, the user is given opportunities to practice language skills by interacting with digital videos of people. As the user walks through the environment and encounters various people therein, the people set forth challenges in the form of scripted questions and tasks that require the user to comprehend the language in order to correctly respond. A speech recognition engine interprets verbal responses of the user, thereby further simulating a real-world environment. A set of one or more scripts controls various aspects of the environment while testing and evaluating the user's comprehension of the language.

21 Claims, 8 Drawing Sheets

VIRTUAL CHALLENGE SYSTEM AND METHOD FOR TEACHING A LANGUAGE

TECHNICAL FIELD

The invention relates generally to computer systems, and more particularly to an instructional product on a computer system for learning, practicing and evaluating language skills.

BACKGROUND OF THE INVENTION

Computers are being used on an ever-increasing basis to help users learn various skills, including learning a foreign language or improving one's native language. As the computer serves as a tutor with essentially unlimited time and unending patience, the skill set learned by a user is essentially a function of the quality of the instructional software in combination with the time and effort put forth by the user.

Users of such instructional language products generally are attempting to learn a language in a self-study environment, without the traditional classroom motivations of homework assignments, the desire to perform well in front of others, and the opportunity to communicate with others in the language. Many times, such users are often busy professionals who value their limited spare time and want to improve their skills in an efficient manner.

In general, the more realistic the language instruction, the better the user will comprehend, enjoy and retain the information being taught, and do so in a more efficient manner. Some computer-based language teaching products have included interactive processes as part of their teaching technique. For example, products may play video clips that branch to other video clips based upon user input during a pause between clips. Another product allows a user to click on displayed objects, and then provides information about each object clicked, e.g., the product displays and/or pronounces the word in the foreign language that is being studied. While such interactivity is often more entertaining, and to some extent, better than attempting to learn from a book, such interactivity is very limited and is not particularly realistic. No known product has heretofore situated the user in a realistic, virtual environment for learning a language.

SUMMARY OF THE INVENTION

Briefly, the present invention provides a system and method for teaching language skills to a user by rendering a three-dimensional graphical representation of a real-world environment, and communicating challenges to the user in that environment. A three dimensional rendering engine implemented as an ActiveX® control may be used to render the environment. The user appears to be situated in the environment and moves within the environment by adjusting the graphical representation of the environment in response to user input. When the user encounters a representation of a person in the environment, the person communicates a challenge to the user, such as by playing a full motion digital video clip of the person. To challenge the user, the person asks the user a question or requests that the user perform a task. The challenge requires language comprehension by the user to correctly respond.

The method and system receive information from the user in response to the challenge and interpret that information to determine whether the user correctly responded. To respond to questions, the user answers via a microphone, and a speech recognizer interprets the answer. For tasks, the actions taken by the user via the pointing device are evaluated to determine if the user correctly responded. A script takes action based on whether the response was correct, such as by providing audiovisual feedback to the user and/or by keeping score to track the user's level of comprehension.

Other advantages will become apparent from the following detailed description when taken in conjunction with the drawings, in which:

DETAILED DESCRIPTION OF THE INVENTION

Exemplary Operating Environment

Figure 1:
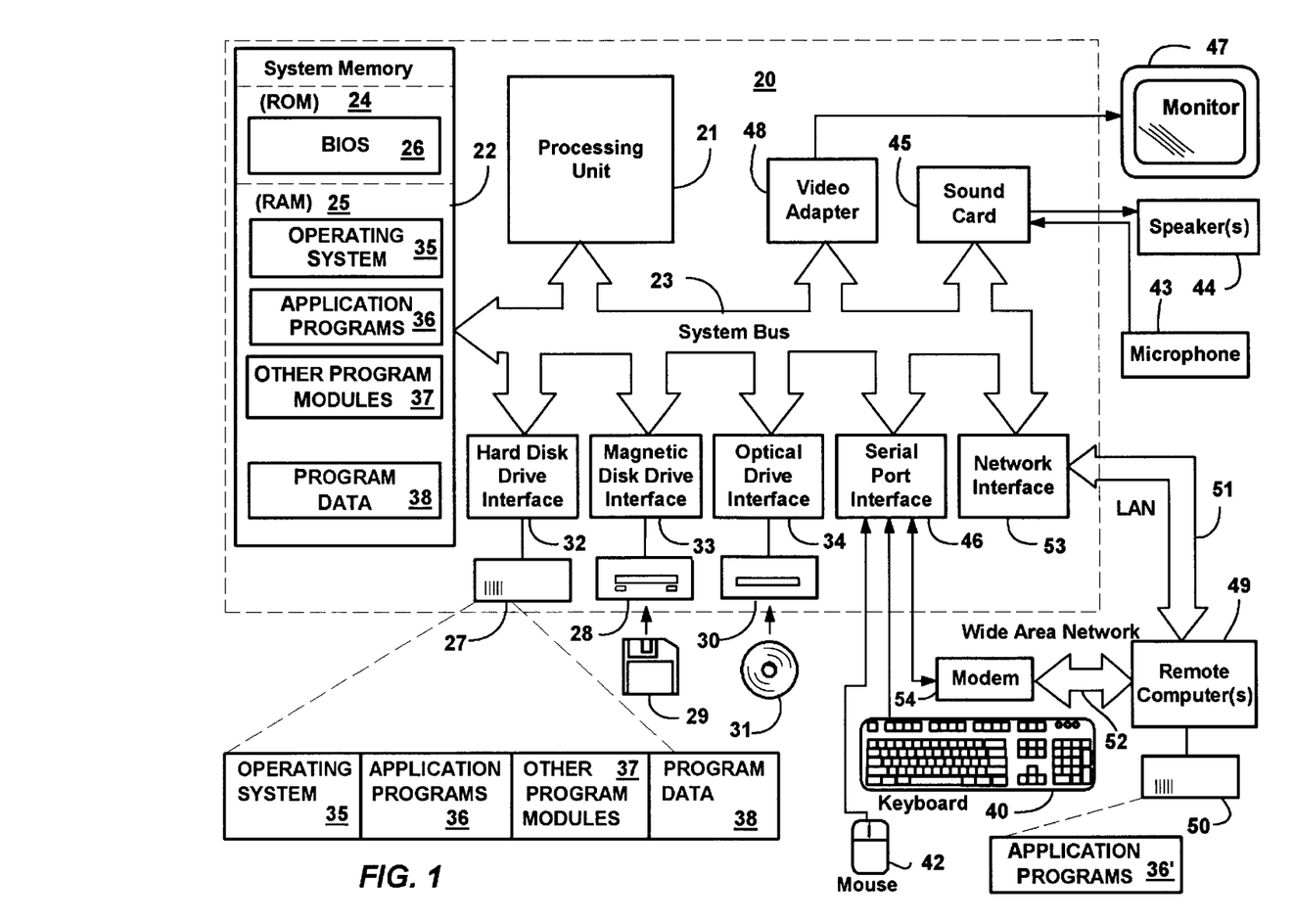
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42, such as a mouse or joystick. A microphone 43 and speakers 44 connect for audio input and output, such as via a sound card 45. Other input devices (not shown) may include a game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as printers (not shown).

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Virtual Challenge

The virtual challenge application, which may be a stand-alone product or included in one or more activities in an application program for teaching language skills, provides language teaching and diagnosis of language comprehension by generating onscreen, a digitally synthesized, interactive graphical representation of an environment. Preferably, each such environment models the real world, e.g., a small town, a car rental agency, a bar and so forth.

Figure 2:
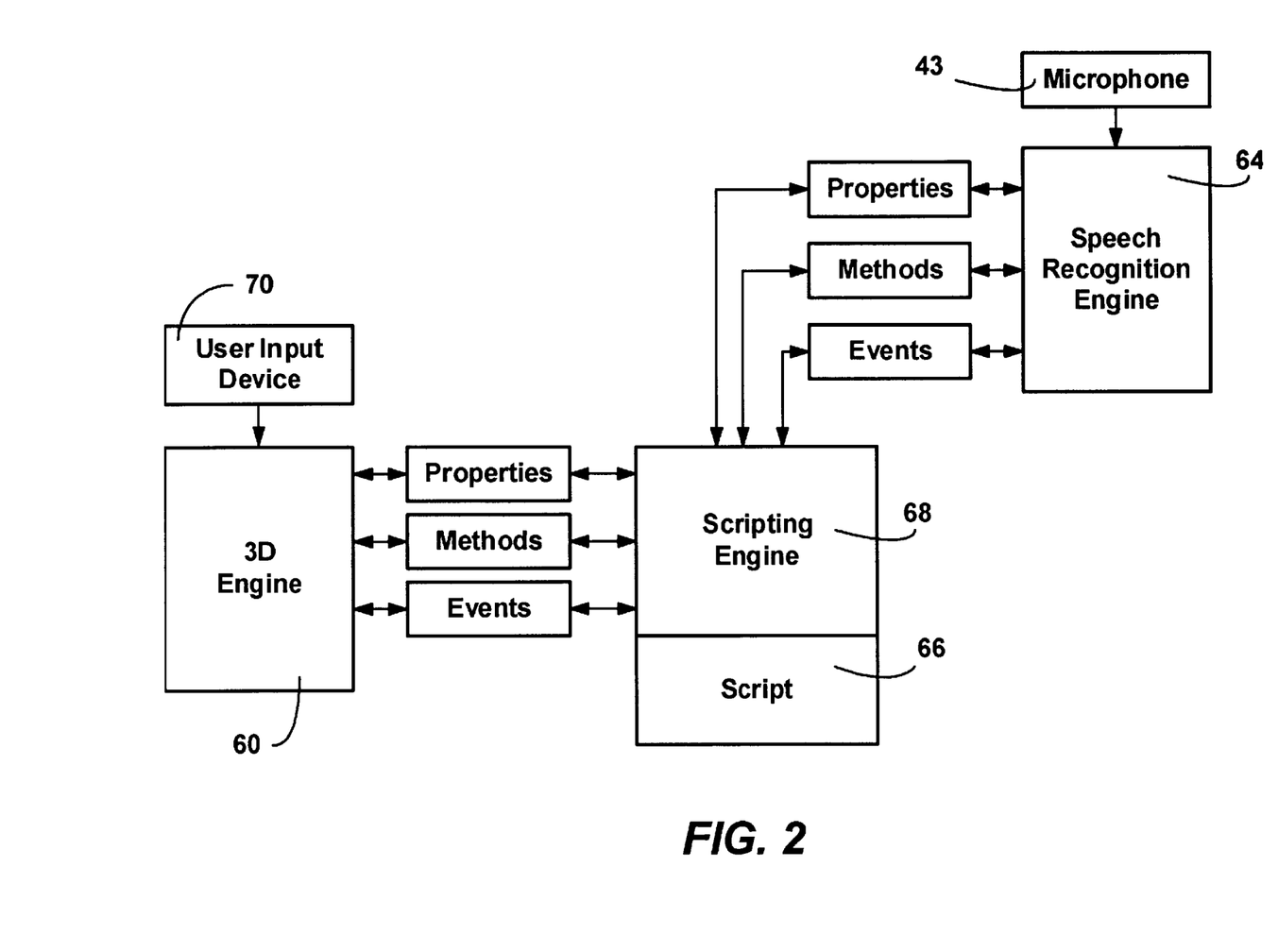
FIG. 2 is a block diagram representing general components for situating the user in a virtual environment for teaching language skills thereto in accordance with aspects of the present invention.

FIG. 2 generally illustrates exemplary components for providing a virtual challenge environment via which a user uses learned language skills in realistic situations. Typically, although not necessarily, the user is provided with challenges in the virtual environment after viewing a lesson. The challenges set forth in the virtual environment correspond to the lesson. Notwithstanding, a single large virtual environment may be configured, or by linking together several virtual environments, a large "world" may be provided to the user. The larger world may correspond to several language lessons, or be provided to the user for practicing and/or testing language skills in general, such as without any particular relationship to a lesson.

In accordance with one aspect of the present invention, within these environments, or "worlds," the user is given opportunities to practice language skills by interacting with people, following directions, and/or completing tasks that are meant to simulate activities which may be encountered in the real world. To this end, the virtual challenge application uses three-dimensional rendering effects created by a 3D-engine 60 (FIG. 2) in combination with other effects and technologies, including a video player 62 (FIG. 3) and speech recognizer 64, to simulate a real-world environment. A set of one or more scripts 66, interpreted by a scripting engine 68, tests the user and controls various aspects of the world, as described below.

By way of example, the program may generate a realistic image of a doctor's office. By moving an input device 70 (typically the pointing device 42 of FIG. 1) in the direction the user wishes to walk or otherwise move, the virtual location of the user changes. The 3D-engine 60 generates, in real time, a new perspective view of the doctor's office as each location is reached. In this manner, the user is given the illusion of walking around inside a seemingly real world.

Moreover, people appear to be in these worlds, in the form of actual photographs of actors placed into the world. When the user approaches and clicks on such a "person," the still image of the selected person is replaced with full motion digital video, played by the video player 62, showing (and audibly sounding) that person speaking, ordinarily in the language being learned. A suitable video player 62 may be implemented via the DirectShow™ API. The video-generated person provides the user with a challenge, such as by audibly asking the user a question, or audibly requesting that the user perform an action. In the first instance, the user's response to the question, spoken into the computer's microphone 43, is analyzed by a speech recognition engine 64. In the second instance, the user's actions are interpreted, e.g., whether the user moved to and clicked on coordinates corresponding to a requested object.

If it is determined (e.g., by the speech recognition engine 64) that the user's response (or actions) were correct in accordance with the script 66, a subsequent video is played acknowledging the correct response (or action), and the virtual challenge continues. If the user was incorrect, the user is asked to repeat the answer and/or is presented with a remediation video giving an example of the correct answer (e.g., a response or action). A rules engine in the scripting tracks the status of the user and offers remediation based on key learning points. In this manner, the user explores a world and practices learned language skills at the user's own pace. Also, while the user is interacting with the world and the people therein, the virtual challenge application may evaluate the user's language comprehension by keeping score of the correct and incorrect responses and actions.

Figure 3:
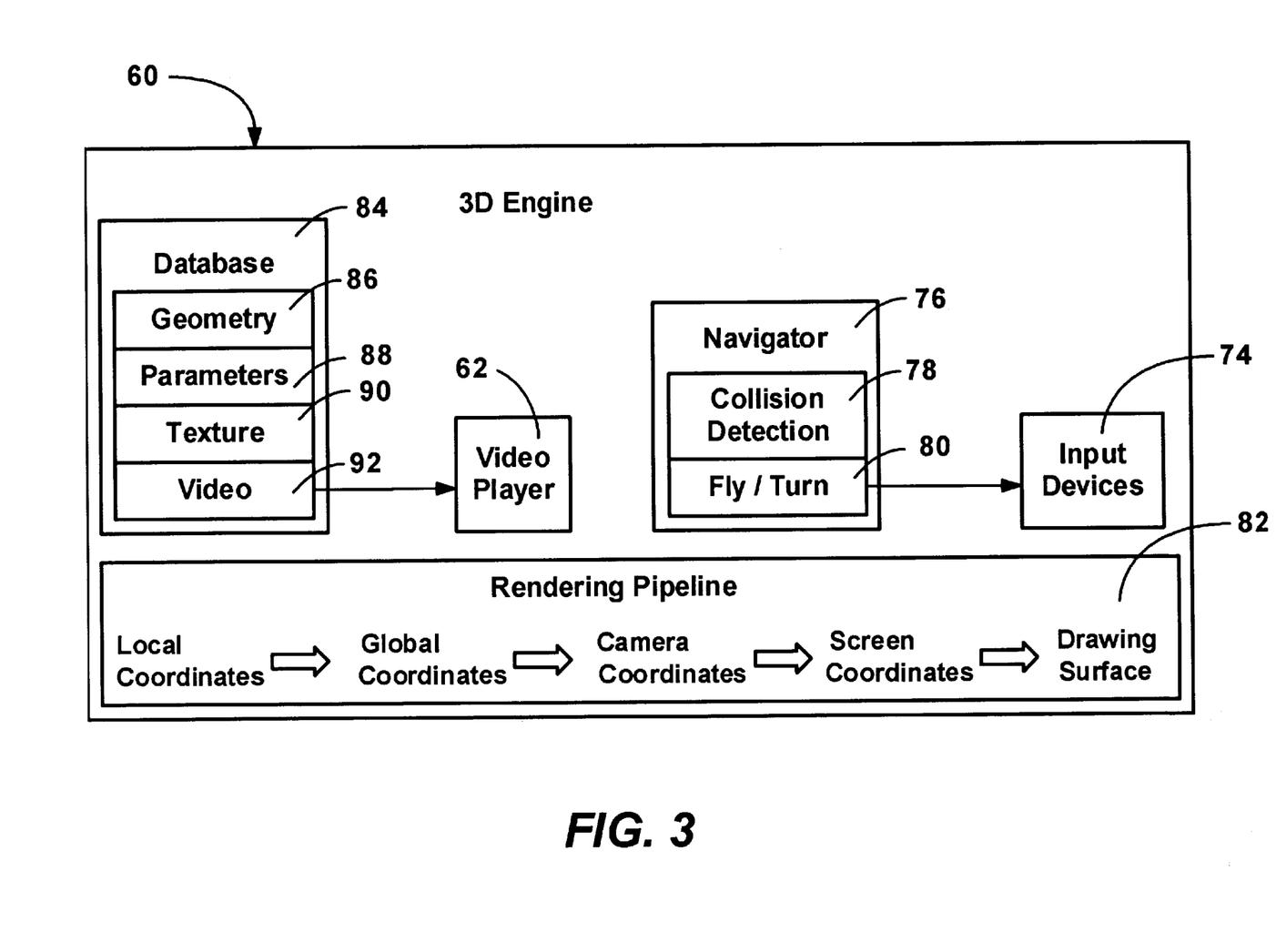
FIG. 3 is a representation of a engine for rendering a three-dimensional displayed environment for learning a language in accordance with an aspect of the present invention.
Figure 4:
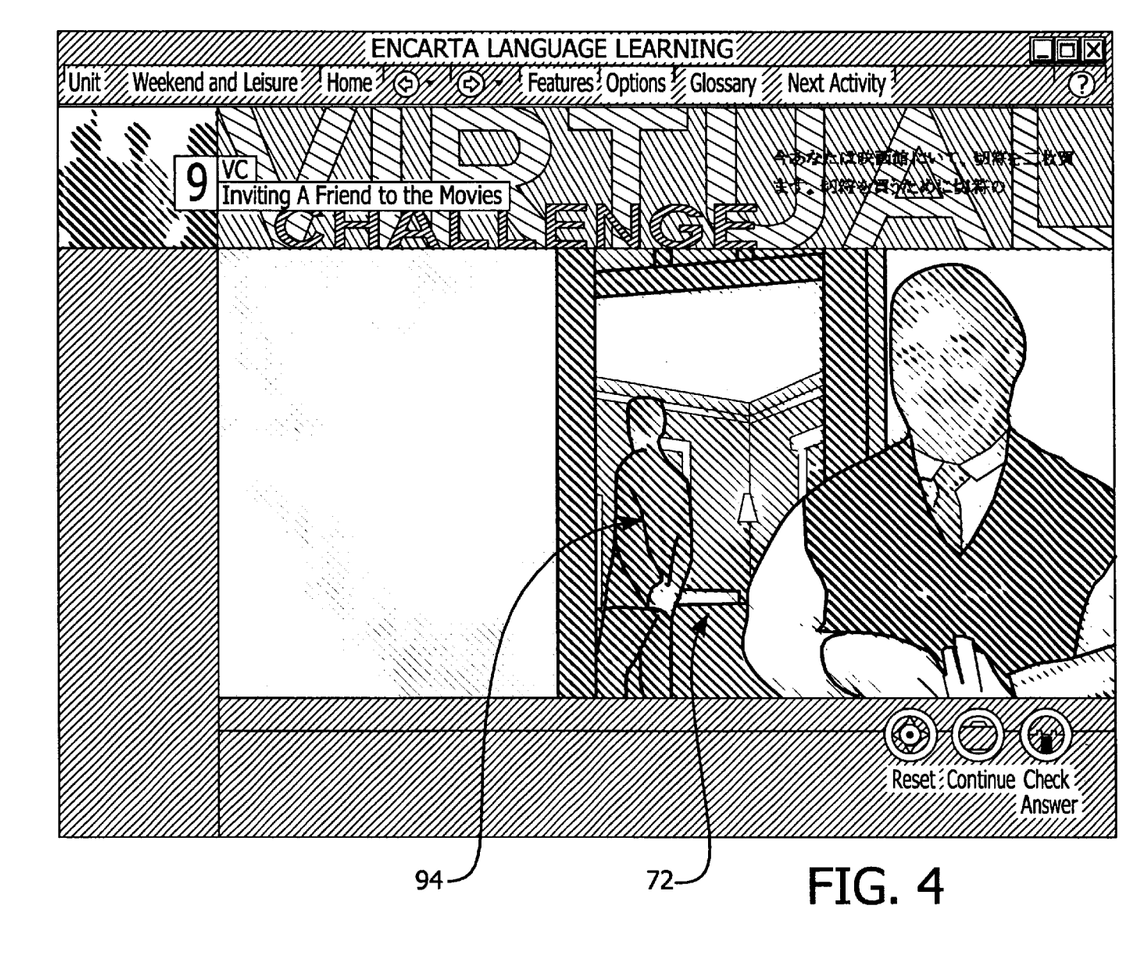
FIG. 4 is a representation of a display screen showing a realistic learning environment.

As shown in FIGS. 2–4, the 3D-engine 60 renders a three-dimensional environment 72 (FIG. 4) in which the user moves around based on input information received from the input device 70, such as via a mouse or a joystick. The 3D-engine 60 generates a borderless window within which full-frame rendering occurs, and within which mouse and/or joystick activity is tracked. Also, when the engine's window has focus, keyboard activity is tracked, causing appropriate Windows Event messages to be generated in a known manner.

Figure 6:
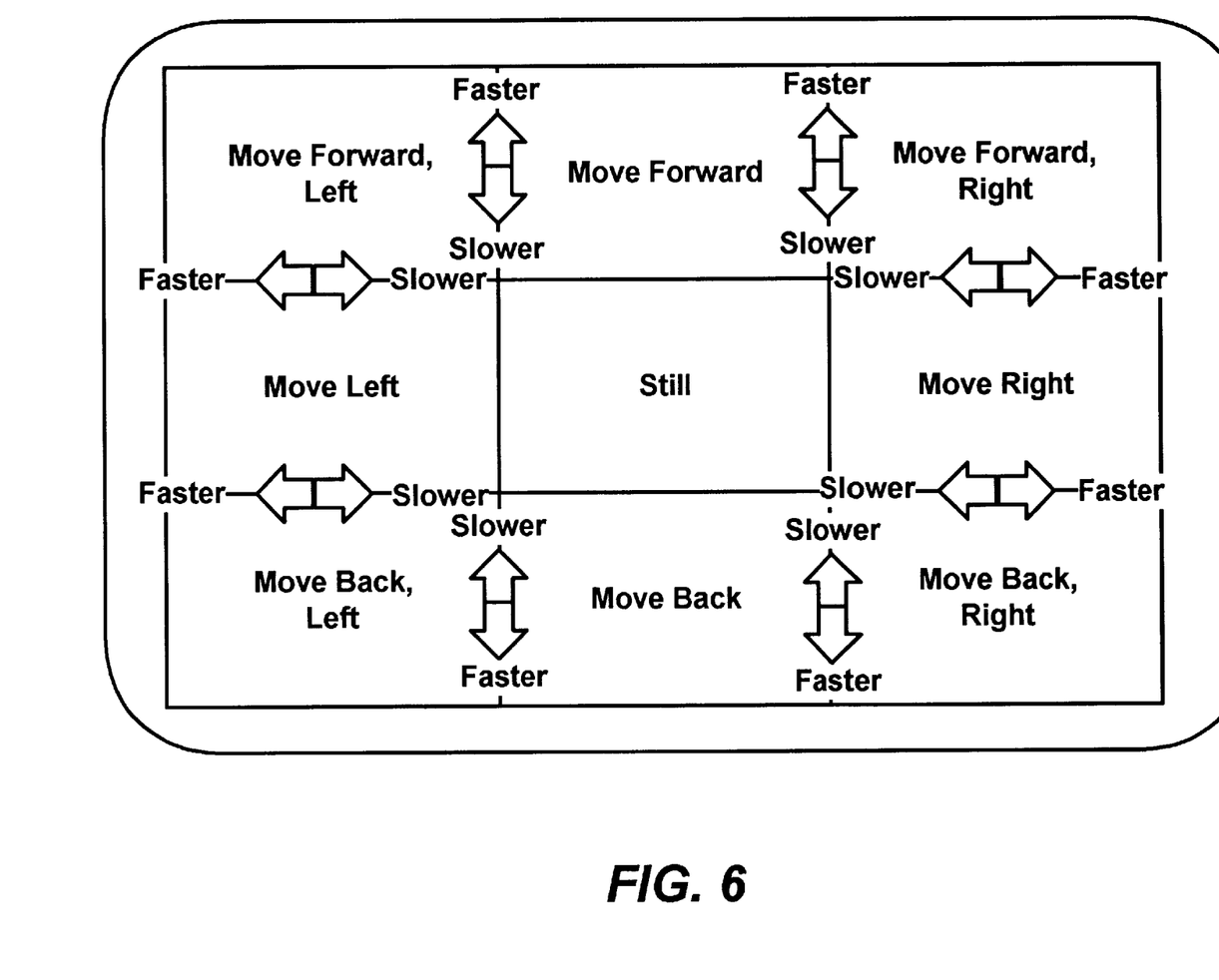
FIG. 6 is a representation of how a user's input actions are interpreted as movement in an environment.

To track input device activity, the engine 60 preferably employs an application programming interface (API) known as "DirectInput," shown in FIG. 3 as the Input Devices mechanism 74. The DirectInput API provides user input information to the 3D-engine 60 faster than the equivalent may be received in a typical messaging scheme, e.g., as mouse/pen events in a message queue. The engine 60 includes a navigator mechanism 76 comprising a collision detection mechanism 78 that keeps the user within the boundaries of the environment, and a fly/turn detector 80 which interprets the coordinates of the mouse/joystick to allow movement in the environment. For example, as generally shown in FIG. 6, a joystick model is followed, such that the coordinates of the mouse pointer on the screen determine both the direction and speed of movement through the environment.

Figure 5A:
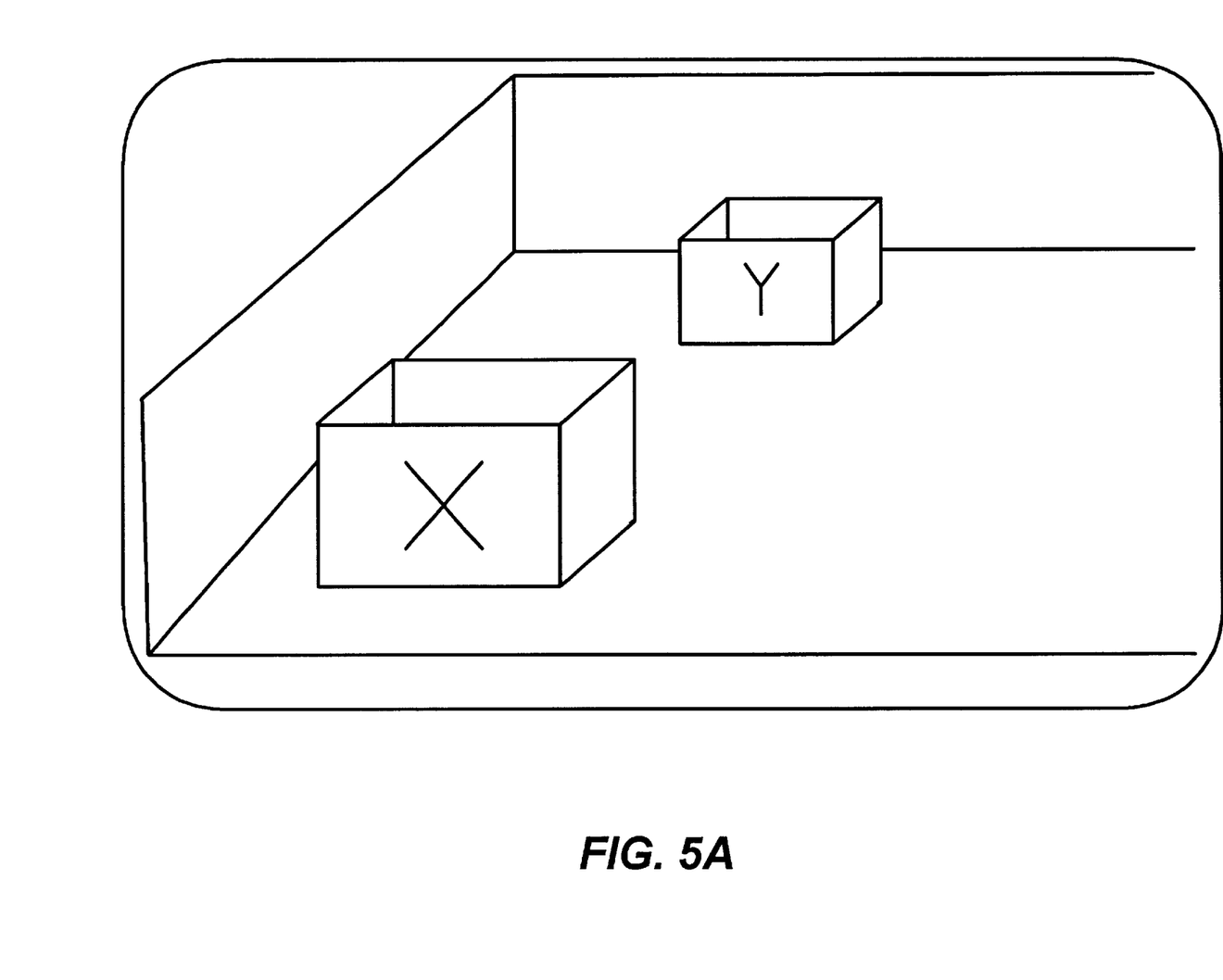
FIGS. 5A–5B are simplified representations of a three-dimensional environment showing how a user's perspective changes while responding to a challenge in accordance with an aspect of the present invention.
Figure 5B:
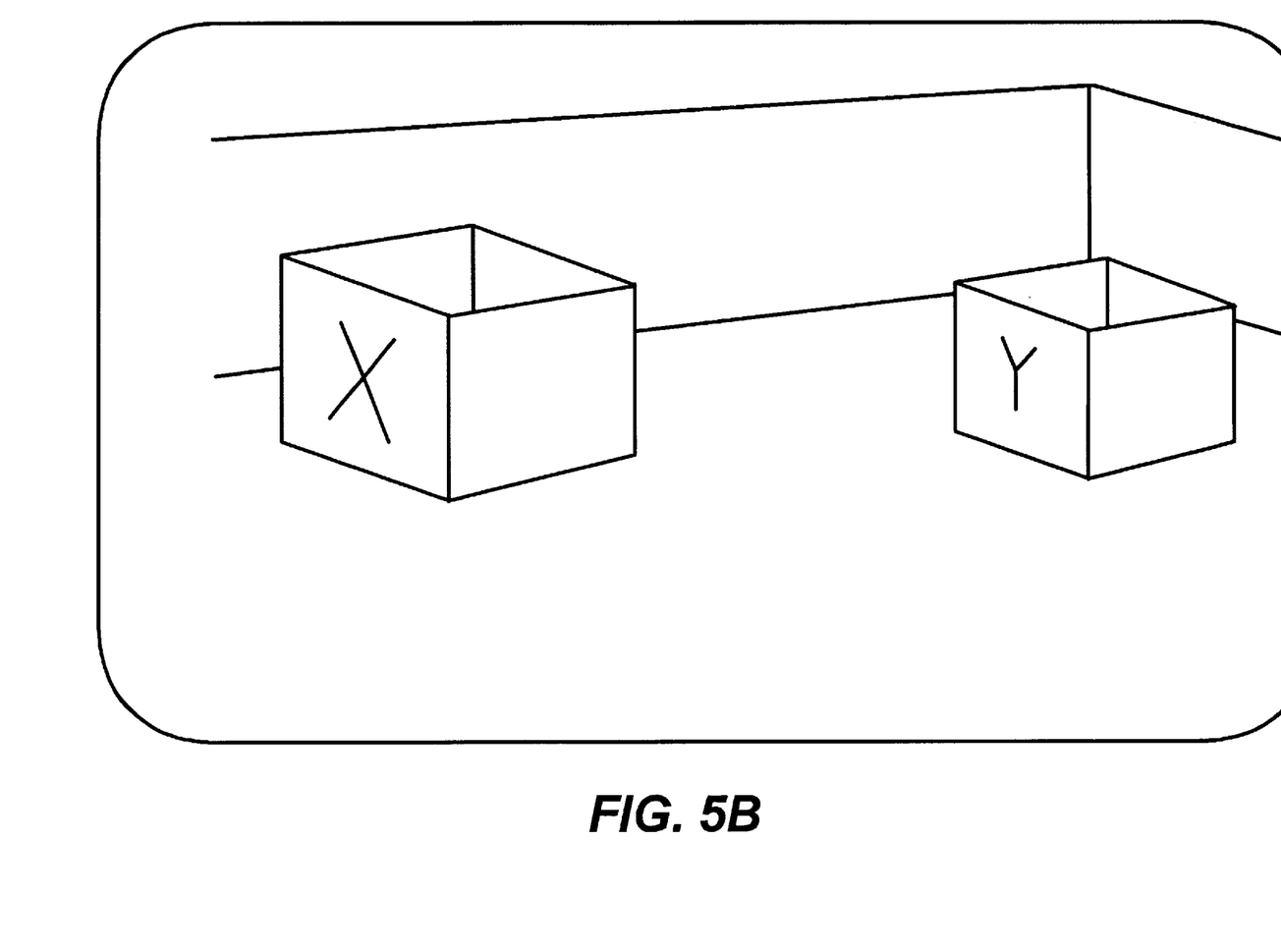

In general, as is known in three-dimensional rendering, the user's perspective is changed by the engine 60 based on the user's desired movement direction detected at the input device 70, as represented in the (extremely-simplified) three-dimensional renderings of FIGS. 5A and 5B. More particularly, the user's position is represented by a camera object which tracks the user's view direction and view coordinates for the 3D-engine 60, which then mathematically adjusts the displayed three-dimensional image via a rendering pipeline 82 (FIG. 3).

Rendering pipelines are generally known in the art of generating three-dimensional environments. The following table sets forth information describing a preferred rendering pipeline 82:

```
Program starts
   Optimized geometry data is loaded and organized into
   Direct3D compliant data structure(s)
      Main Loop starts:
         User input gets interpreted as
            navigation/interaction decisions*
         User input is compared to navigation constraints
            through collision detection
         Creation of transform matrix for world-to-view
            transformation
         Rendering pipeline:
         {
            Clear image-buffer
            Clear Z_buffer
```

-continued

```
            Begin polygon
               Virtual step* gets carried out.
               Transform vertices to view coordinates
               Test for Backface culling
               Clip to view space:   Sutherland-Hodgeman
                                     Algorithm
               Set up for fixed point perspective-corrected
                  mapping
               View-to-screen transform
               Edge rasterization of n-sided polygon
               Walk edge-table and render spans,
                  perspective-correcting every 16 pixels
            Next polygon
            Move image-buffer to screen
         }
      Main Loop
Program ends
``` where *navigation/interaction decisions include exploring a world and clicking on objects in the world, and *virtual steps include Sprite rotation, texture animation effects and digital video playback (described below).

The primary function of the engine 60 is to dynamically calculate the user's viewpoint within a predetermined three-dimensional world made of geometric data, and render in color, with appropriate perspective and clipping, what the user would see. As a result, the user is given the perception of being able to 'walk' around in the world. The illusion is particularly compelling because the constraints of the real world, e.g., collision detection, gravity, lighting, parallax, and so on may be modeled by the engine 60 accurately and at a sufficiently high frame rate. Notwithstanding, the present invention is not limited to pure three-dimensional rendering, but rather encompasses any way of moving within a space for interacting with persons and objects to learn a language. For example, side-scrolling technology in combination with digital video would provide a somewhat similar, although less-realistic, environment in which a user may interact to learn a language in accordance with the present invention.

A preferred engine 60 is implemented as an ActiveX® Control (.ocx) presently referred to as 3Dxplore™. This control (like most ActiveX Controls) may be inserted into project files created by applications including Microsoft® Corporation's Visual Basic®, FrontPage®, and Visual C++® products. Functionality is exposed cleanly to a script author in the form of Properties, Methods, and Events as described below. By scripting the control's data through these features, the script author provides the virtual challenge application with powerful three-dimensional, real-time graphics. As a result, the script author need not be concerned with rendering the three-dimensional image, nor with recognizing speech, but rather is able to concentrate on providing worthy challenges to a user to test the user's comprehension of a language. Notwithstanding, although the various components are shown and described herein as separate components because of certain benefits resulting from separated functionality, it can be readily appreciated that some or all of the components may be combined into more complex components, and/or separated even further into additional components.

Properties appear to the script 66 as static-state variables that control parameters within the control space. More particularly, Properties map to a Get/Set pair of class member functions. Typical Properties that a control may expose include, Size, Color, Width, Text, and Frequency. Methods are functions of the control that may be called. When called with arguments passed thereto, member functions are called directly within the control classes. Typical Methods that the control (engine) 60 may provide include LoadPicture(path), Erase( ), Line(x1,y1)-(x2,y2), BF, Color, Reset( ), Refresh( ), and SetFocus( ). Lastly, Events are message notifications that are sent by the control 60 whenever certain predetermined things occur. An author may attach "Event Handlers" (provided by the authoring environment) to a script, allowing the script 66 to automate the launching of functionality when a specific event occurs within the control, without having to regularly test for the occurrence. Typical Events that a control may expose include OnCreate, OnMouseMove, OnClick, OnMouseUp, OnError and so forth.

The 3D-engine (ActiveX® control) 60 includes the Properties, Methods and Events set forth in the following tables:

| Properties: | |
| --- | --- |
| Intrinsic | Left |
| | Top |
| | Width |
| | Height |
| | Visible |
| | Enable |
| Rendering | RenderBaseWidth |
| | RenderBaseHeight |
| | FullScreenWidth |
| | FullScreenHeight |
| | FullScreenMode |
| | FilterType |
| | BackColor |
| | TexturePath |

| Events: |
| --- |
| OnMouseDown (screenX, screenY, polygonID) |
| OnMouseUp (screenX, screenY, polygonID) |
| OnKeyDown (Keycode) |
| OnKeyUp (Keycode) |
| OnStart () |
| OnEnd () |
| OnError (errorType) |
| OnCollision (polygonID, polygonName) |

| Methods: | |
| --- | --- |
| Hardware | UseHardware |
| | UseKeyboardDefaults |
| File | |
| | LoadXFile (filename) |
| Polygon | GetMaterialID (polygonID) |
| | GetPolygonID (polygonName) |
| | SetPolygonSprite (polygonID, true or false) |
| | SetpolygonStatic (polygonID, true or false) |
| | SetPolygonVisible (polygonID, true or false) |
| | SetStaticLoc (polygonID, X, Y) |
| | SetStaticSize (polygonID, Height, Width) |
| | SetMaterial (polygonID, MaterialID) |
| | SetAVItoPolygon (polygonID, AVIname) |
| Navigation | FlyIncrement |
| | TurnIncrement |
| | FieldOfView |
| | FlyForward () |
| | FlyLeft () |
| | FlyRight () |
| | FlyUp |

-continued

| Methods: | |
| --- | --- |
| | FlyDown |
| | FlyBackward () |
| | TurnUp |
| | TurnDown |
| | TurnLeft () |
| | TurnRight () |
| | FlyToPolygon (polygonID) |
| | GetCameraCoords () as coord [3] |
| Cursor | ScreenLocX |
| | ScreenLocY |
| | FloatBack () |
| | FindPolygonOver (x, y) |
| | FindUVOver () |
| | FindStaticExcept (polygonID) |
| | FindSpriteExcept (polygonID) |
| | FindPolygonExcept (polygonID) |
| | FindSpriteOver () |
| | FindStaticOver () |
| | StickPolygonToCursor (polygonID) |
| AVIs | PlayAVI (AVIname) |
| | StopAVI (AVIname) |
| | AVItoEnd (AVIname) |
| | AVItoStart (AVIname) |
| Rendering | Redraw |

As shown in FIG. 3, the 3D engine 60 includes a database file 84 including the geometry 86, rendering parameters 88 and textures 90 for polygons it can display. Polygons are flat, linear-edged surfaces of arbitrary size, which, in sufficient quantity, may simulate curved surfaces. Sprite polygons are polygons that rotate to face the user, i.e., they are never viewed from the side. Sprite polygons are used to prevent a flat image from appearing flat, which would occur if such an image were seen at an angle. Texturemaps are full-color images which are mapped onto a polygon, whereby local detail can be generated while maintaining geometric simplicity. Within the world, the user may thus be provided a variety of geometric structures used to simulate reality.

Many actions seen in the environment are scripted based on the user interaction with the engine 60. For example, via the script 66, polygons can change texturemaps, animate textures and change visibility. Such polygon behavior may be triggered by mouseclicks, keystrokes or script. Moreover, digital video (with audio) can be played on polygons. To this end, the database file also includes AVI video clips 92 for the video player 62 to play, typically showing and sounding the speaking persons of the environment. For example, spritegons AVI are polygons that always face the user and can play AVIs with transparency. Thus, a flat image of a person always faces the user, and when clicked, becomes transparent so that the AVI plays without the still image being seen. Which AVI, and when it plays, may be controlled from scripting, and may be made dependent on an event, such as the aforementioned mouse click, or proximity to something.

In accordance with one aspect of the present invention, the user has the ability to "converse" with a person, actually a spritegon branching AVI. As described above, a speech recognition engine 64 (e.g., using Microsoft Corporation's Speech Technology (SAPI 4.0)) compares the user's verbal responses with model answers, generally in the form of keywords sent by the script 66 to the speech recognition engine 64. This provides the application with the ability to analyze the progress of the user through the lessons.

By way of example, a script 66 causes a video to be played requesting a response (e.g., "What are you looking for") that if interpreted in the proper context and correctly responded to by the user, would at least include the words, "jack" or "butterfield" or "office." Prior to expecting the response, the script 66 sends the following information to the speech recognition engine 64:

<Start>= . . . (commands) . . . \n\r[(commands)]\n\r= jack\n\r=butterfield\n\r=office\n\r=?

The speech recognition engine 64 returns a true or false value for whether it has heard a specific phonetic pattern, e.g., 'J-A-K'. In this manner, if "jack" or "butterfield" or "office" is recognized, the speech recognition engine 64 will return a true value to the script 66, which will then consider the response correct. The script 66 will then typically cause a video indicating success to be played. Conversely, if none of the phonetic patterns are recognized, the script 66 may play a video requesting the user to try again ("I didn't understand you") and/or may cause a remediation lesson to be replayed. Alternatively, the speech recognition engine 64 may return a string of text to the script 66, whereby the script 66 may determine from that text whether the user responded correctly.

In accordance with another aspect of the present invention, in addition to evaluating via spoken responses to questions, simulated items represented by one or more polygons may be picked up and dragged with the mouse, after which the polygon may be made to land within the environment or into a user interface of the instructional program. In this manner, the user may be assigned a task to evaluate language comprehension, e.g., "go and get the box that is nearest the back wall" (FIGS. 5A and 5B). If the user moves to and clicks on the box marked with the "Y" and drags it to an appropriate retrieval location, the user comprehended the instruction and thus the result is a success. Note that the user does not simply click on an object fixed on the screen, but rather the objects change perspective as the user moves via the mouse, as generally represented in FIGS. 5A and 5B, until the user appears very close to the object to be selected, again better simulating a real-world task.

Figure 7:
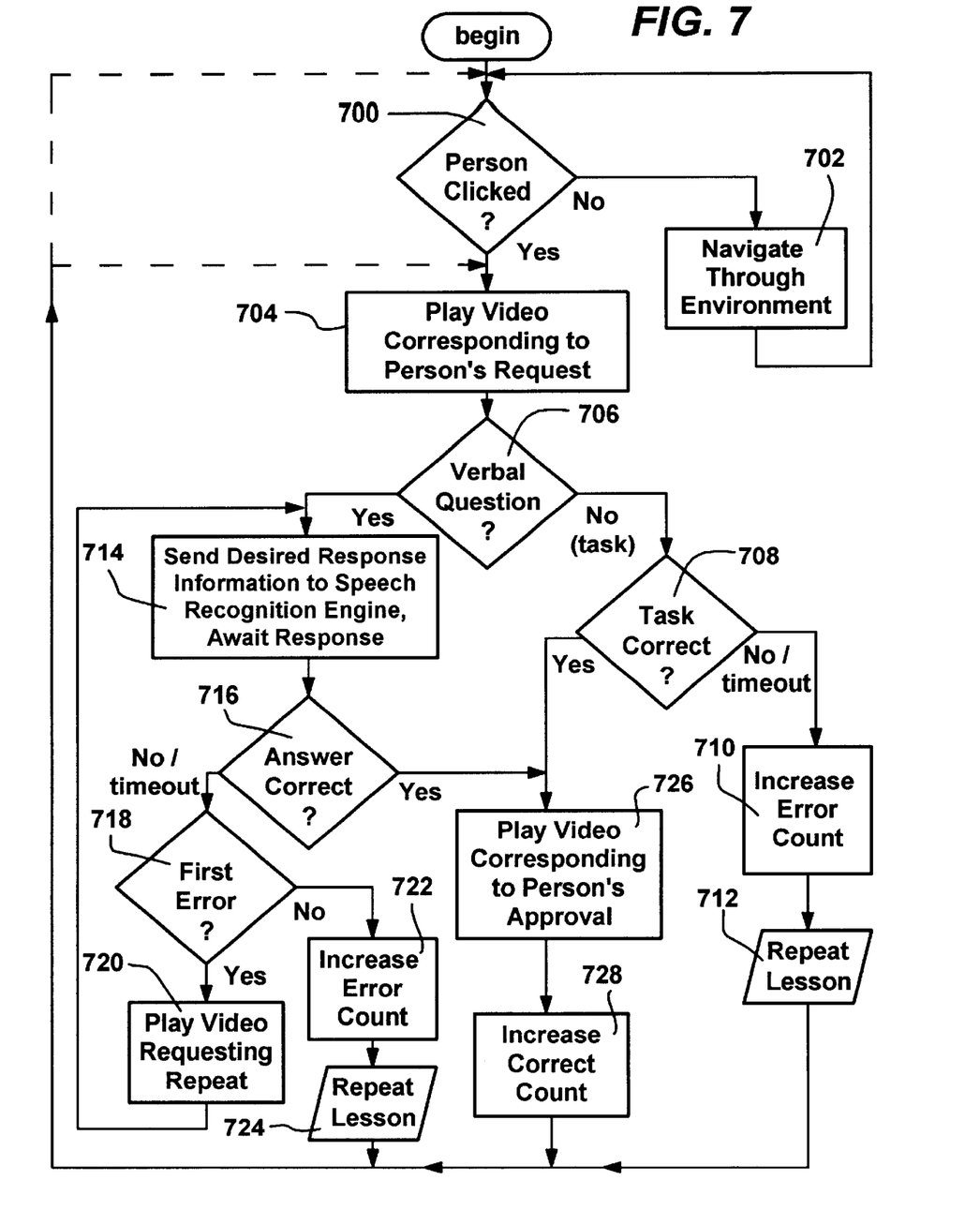
FIG. 7 is a flow diagram showing general steps taken in an exemplary scenario to challenge a user's language comprehension by requesting the user to verbally respond and perform tasks in a virtual environment in accordance with one aspect of the present invention.

Turning to an explanation of the operation of the invention with particular reference to the flow diagram of FIG. 7, there is shown an example of how a user may interact with a virtual challenge application of the present invention. Note that for purposes of simplicity, FIG. 7 shows a number of decisions branching to various actions, however as can be readily appreciated, many of the actions taken by the virtual challenge are actually event driven. Thus, steps 700–702 represent the ongoing process of walking through the environment until a person is clicked, actually detected by the script 66 in the form of an event. For example, as shown in FIG. 4, the user may enter the room environment 72, and approach and click on the person labeled 94, at which time the script 66 will receive an event notification. Note that proximity to a person, possibly in combination with a stoppage in user movement, may also be treated the same way by the engine 60 as clicking on a person. Further, note that instead of a person, another object, such as a representation of a tape recorder, may be provided to issue a challenge.

When a person 94 is encountered/clicked on, step 704 is executed, whereby the script 66 instructs the 3D-engine 60 to play a video of that person at a location corresponding to the still image (spritegon) representing that person. Ordinarily, the digital video clip will be that of a person making a request, such as asking the user to perform a task or asking the user a question. For purposes of simplicity, the simple script described in FIG. 7 is limited to the digital video either asking a question or requesting performance of a task, after which the script 66 either receives a result (correct or incorrect) or times out if the user does not act. Note that a more sophisticated script might ask the user to follow multiple directions to perform a task, whereby a user might be allowed to interrogate other persons and/or perform intermediate tasks.

As shown in FIG. 7, if a task was requested, (e.g., retrieve some object) the script 66 in combination with user input information received via the 3D-engine 60 will essentially determine whether the user correctly performs the task. For example, to test for comprehension, the user may be asked (e.g., by the person in FIG. 4) to retrieve the box against the back wall (labeled "Y") in FIG. 5A. If the user makes a known error such as retrieving the box labeled "X," or otherwise fails to retrieve the box labeled "Y," step 708 branches to step 710 where an error count is increased by some amount, possibly corresponding to the difficulty of the request. At step 712, a lesson may be repeated to the user, e.g., teaching the difference between a box at the back wall and a box on the left wall. Step 712 then returns to step 700, but optionally may return to step 704, for example, to repeat the video request to the user following the remedial lesson, particularly if the user is still closely facing the requestor's image.

If the user correctly performed the task, e.g., the mouse movements, clicks and/or click releases took place at appropriate locations relative to the displayed world, step 708 branches to step 726 where the success of the user is typically acknowledged, for example, by playing a subsequent video thanking the person. Then, if comprehension is being tracked by the script 66, a count of the correct actions or the like, which may be maintained, is increased an appropriate amount, possible weighted based on the difficulty of the task. Then, (as represented by the dashed lines of FIG. 7), the script may return the user to step 700 to enable further movement in the environment, or alternatively return to step 704 to play a further video, e.g., to immediately provide a follow-up challenge. As can be readily appreciated, the script 66 controls the user's interaction with the world.

Returning to step 704, if a question (instead of a task) was asked, step 706 branches to step 714 wherein the script sends the desired answer to the speech recognition engine 64. The recognition engine 64 returns with either a true or false result, or if too much time elapses without a result, the script 66 treats the user as having given an incorrect response. Step 716 represents the test for the correct response or incorrect response/timeout, and branches to step 718 if the response was incorrect or not provided. At step 718, if the original question was only asked once, step 720 is executed requesting the user to repeat the response, essentially giving the user the benefit of the doubt. Step 720 then returns to step 714 to await the response, (again providing the desired response information to the recognition engine 64, if necessary). Note that alternatively, as controlled by the script 66, step 720 may return to step 704 to repeat the video or some portion thereof to again repeat the question to the user. Moreover, certain known incorrect responses may be detected, possibly resulting in the user not being given a second chance via step 718 and/or resulting in a more significant error being counted.

If at step 716 the answer is again incorrect or not provided, step 718 is executed, this time branching to step 722 where an error count is increased. Step 724 may then be executed to show the user the lesson in which the information necessary to properly respond to the question was taught. As represented by the dashed lines in FIG. 7, Step 724 may then return to step 700 where the user is again free to move in the environment, or to step 704 where the same or a different video may be played.

If the user responds correctly at step 716, step 726 is executed wherein an approval video is ordinarily played. As can be readily appreciated, such immediate feedback is both realistic and beneficial for learning. Then, at step 728, a correct counter may be increased an appropriate amount by the script 66. In this manner, the skill level of a user is evaluated by tracking correct and incorrect responses, weighted to the questions and/or tasks as desired. Step 728 may return to step 700, or may alternatively return to step 704 such as to play a subsequent video from that person 94. As can be readily appreciated, by returning one or more times to step 704, the opportunity for a realistic back-and-forth conversation may thus be provided to a user as determined by the script 66.

The following represents a simple script in psuedocode, essentially corresponding to selected steps in the flow diagram of FIG. 7:

```
onMouseClick (polygonID)
    If (polygonID==getPolygonID of "Fred")
    Then flyTo polygonID
onFlyToFinished (polygonID)
    If (polygonID==getPolygonID of "Fred")
    Then playAVI "FredAVI.avi" on polygonID
onPlayAVIFinished (polygonID)
    If (polygonID==getPolygonID of "Fred")
    wordList="yes" or "no"
    Then SpeechEngine.SetGrammar wordList
onSpeechEngine_PhraseFinished (wordList, phraseHeard)
    If (phraseHeard in wordList) and (phraseHeard="yes")
    Then playAVI "YesAVI.avi" on getPolygonID of "Fred"
        Else playAVI "NoAVI.avi" on getPolygonID of "Fred"
```

As can be seen from the foregoing detailed description, there is provided a method and system that allows a user to interact and respond to challenges in a virtual environment for learning a language. The virtual environment provides a realistic way in which to practice and test comprehension of a language by challenging a user to appropriately respond by words or actions.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system a method for teaching language skills to a user, comprising:
    rendering a graphical representation of an environment;
    adjusting the graphical representation of the environment in response to user input to simulate moving in the environment;
    encountering a representation of an object in the environment;
    communicating a challenge from the object to the user, the challenge requiring comprehension of a language by the user to correctly respond thereto;
    receiving information from the user in response to the challenge; and
    in response to receiving the information from the user, automatically providing information to the user indicative of whether the user comprehended the challenge.

2. The method of claim 1 wherein the graphical representation of the environment is three-dimensional.

3. The method of claim 2 wherein adjusting the graphical representation of the environment includes changing the viewing perspective in response to the user input.

4. The method of claim 1 wherein communicating a challenge from the object to the user includes outputting full motion video information.

5. The method of claim 1 wherein communicating a challenge from the object to the user includes providing audio output to the user.

6. The method of claim 5 wherein communicating a challenge includes outputting full motion video information in conjunction with the audio output.

7. The method of claim 1 wherein encountering a representation of an object in the environment includes encountering a representation of a person.

8. The method of claim 1 wherein the challenge corresponds to a question, and wherein receiving information from the user in response to the challenge includes receiving an audible response from the user.

9. The method of claim 8 further comprising interpreting the audible response to determine whether the user properly responded to the question.

10. The method of claim 1 wherein the challenge corresponds to a task, and wherein receiving information from the user in response to the challenge includes receiving user input from a pointing device.

11. The method of claim 1 wherein providing information to the user indicative of whether the user comprehended the challenge includes outputting fill motion video information to the user.

12. The method of claim 1 wherein providing information to the user indicative of whether the user comprehended the challenge includes outputting audio information to the user.

13. The method of claim 1 further comprising, communicating a plurality of additional challenges to the user, and tracking the user's comprehension of the challenges.

14. In a computer system, a system for teaching language skins to a user, comprising:
    an engine configured to render a three-dimensional graphical representation of an environment and for adjusting the graphical representation of the environment in response to user input to simulate moving in the environment;
    a detection mechanism configured to determine when a user encounters a representation of an object in the environment;
    a video player configured to communicate an audiovisual challenge from the object to the user, the challenge requiring comprehension of a language by the user to correctly respond thereto;
    a microphone configured to receive audio information from the user in response to the challenge;
    a speech recognizer configured to interpret the audio information and provide information corresponding thereto; and
    a script configured to evaluate the information provided by the speech recognizer to make a determination as to whether the user comprehended the challenge, and to automatically take action based on the determination.

15. The system of claim 14 further comprising a pointing device configured to provide user input to the engine to adjust the graphical representation of the environment.

16. The system of claim 14 wherein the speech recognizer is configured to return a value to the script indicative of whether the audio information corresponded to information previously sent from the script to the speech recognizer.

17. The system of claim 14 wherein the script is configured to maintain a score with respect to the comprehension of the challenge by the user.

18. The system of claim 14 wherein the script is configured to take action in response to the determination by providing information to the user indicative of whether the user comprehended the challenge.

19. A computer-readable medium having computer executable instructions comprising:

rendering a three-dimensional graphical representation of an environment;

adjusting the graphical representation of the environment in response to user input to simulate moving in the environment;

encountering a representation of a person in the environment;

communicating a verbal challenge from the person to the user, the challenge requiring comprehension of a language by the user to correctly respond thereto;

receiving an audible response from the user in response to the challenge; and automatically interpreting the audible response to determine whether the user comprehended the challenge.

20. The computer-readable medium of claim 19 having further computer executable instructions for providing information to the user indicative of whether the user comprehended the challenge.

21. A computer-readable medium having computer executable instructions for performing the method of claim 1.

* * * * *

UNITED STATES PATENT AND TRADEMARK OFFICE
CERTIFICATE OF CORRECTION

PATENT NO. : 6,234,802 B1
DATED : May 22, 2001
INVENTOR(S) : Pella et al.

It is certified that error appears in the above-identified patent and that said Letters Patent is hereby corrected as shown below:

Column 7,
Line 3, "(x1,y1)-(x2,y2)" should read -- (x1,y1)-(x2,y2) --.

Column 11,
Line 54, "system a" should read -- system, a --.

Column 12,
Line 33, "fill" should read -- full --.
Line 43, "skins" should read -- skills --.

Signed and Sealed this

Twelfth Day of October, 2004

JON W. DUDAS
*Director of the United States Patent and Trademark Office*